United States Patent [19]
Quesinberry et al.

[11] 3,786,275
[45] Jan. 15, 1974

[54] CIRCUIT AND METHOD FOR ARC PROTECTION OF LINEAR BEAM DEVICES

[75] Inventors: Arden L. Quesinberry, Towson; Edward J. Lawson, Baltimore, both of Md.

[73] Assignee: Westinghouse Electric Corporation, Pittsburgh, Pa.

[22] Filed: July 28, 1972

[21] Appl. No.: 276,290

[52] U.S. Cl. .................... 307/136, 328/8, 328/232, 328/259
[51] Int. Cl. ............................................ H01h 9/30
[58] Field of Search ................. 328/8, 9, 232, 259, 328/265; 307/136; 315/3.5; 330/43; 317/11 R

[56] References Cited
UNITED STATES PATENTS

| | | | |
|---|---|---|---|
| 3,259,855 | 7/1966 | Massey | 328/232 X |
| 3,369,188 | 2/1968 | Stover et al. | 330/43 |
| 3,474,343 | 10/1969 | Smith | 328/8 |
| 3,636,476 | 1/1972 | Milberger | 328/232 X |

Primary Examiner—Robert K. Schaefer
Assistant Examiner—William J. Smith
Attorney—F. H. Henson et al.

[57] ABSTRACT

A method and circuit for protecting a linear beam device such as a klystron from damage due to cathode-to-body member arcing. The linear beam device is supplied with body member and collector electrode voltages from serially connected power supplies which are both referenced to the cathode electrode. A diode poled to block current flow away from the collector electrode is provided between the collector electrode and the interconnection or junction between the power supplies. The diode thus prevents high current flow from the collector supply resulting from a cathode-to-body member arc.

12 Claims, 4 Drawing Figures

CIRCUIT AND METHOD FOR ARC PROTECTION OF LINEAR BEAM DEVICES

BACKGROUND OF THE INVENTION

1. Field of the Invention

This invention relates to high power linear beam devices and, more particularly, to a method and apparatus for protecting linear beam devices from the effects of arcing between the cathodes and body members thereof.

2. State of the Prior Art

Linear beam devices such as Klystrons and traveling wave tubes have been provided with independent power supplies for each of the elements of the device, e.g., independent body and collector supplies. When cathode electrode-to-body member arcing occurs, only the body power supply contributes to the cathode electrode-to-body member current since the body power supply is independent of the power supplies for other linear beam device elements. This arcing current may thus be controlled by conventional current limiting techniques without adversely affecting collector supply current.

The use of independent supplies may, however, necessitate two rather large power supplies. When, for instance, a depressed collector is utilized with a linear beam device, the collector power supply may be on the order of 25 Kv. while the body power supply typically may be on the order of 40 Kv.

The need for the independent 40 Kv. body power supply can be eliminated by connecting a 15 Kv. power supply in series with the 25 Kv. collector power supply to generate the required 40 Kv. body power supply voltage. However, by so doing, the collector and body power supplies are no longer independent and collector power supply current which includes large quantities of stored energy may be added to the body power supply current between the cathode electrode and the body member of the linear beam device upon cathode electrode-to-body member arcing. This additional current may damage the cathode electrode due to the extremely high collector power supply current.

Current limiting circuits and crowbar circuits are frequently used to mitigate the effect of this dumped stored energy on the linear beam device. However, crowbar circuits add significantly to the size, weight and complexity of high power linear beam device power supplies and current limiting circuits may limit current undesirably during normal linear beam device operation.

OBJECTS AND SUMMARY OF THE INVENTION

It is accordingly an object of this invention to provide a novel method and apparatus for protecting linear beam devices from damage due to cathode electrode-to-body member arcing.

It is a further object of this invention to provide a novel method and apparatus for isolating the anode electrode-to-cathode electrode circuit in a linear beam device thereby reducing the high current discharge normally associated with arcing between the cathode electrode and body member of the linear beam device.

It is another object of this invention to provide a novel method and apparatus for supplying power to a linear beam device from a plurality of power supplies connected in series aiding to achieve the necessary anode elecrode-to-cathode electrode potential and in which current flowing between the cathode electrode and the body member during arcing is limited to a single power supply.

Briefly, according to the present invention, a linear beam device is provided with a body member power supply connected in series with an electrode power supply, e.g., the collector power supply. The electrode power supply may be connected between the cathode electrode and the anode or collector electrode and may include a large storage capacitor therebetween for storing electrical energy for the operation of the device. Diode means are provided between the anode electrode connected end of the capacitor and the interconnection between the electrode power supply and the body member power supply. The diode prevents the capacitor from discharging through the cathode electrode of the linear beam device capacitor by eliminating the electrode power supply current from the body power supply current which flows between the cathode electrode and the body member during arcing. The necessity is thus obviated of providing the electrode supply with complicated shunting circuitry such as the aforementioned crowbar type circuits to prevent burning of the cathode electrode and/or other elements in the linear beam device during cathode electrode-to-body member arcing. The necessity for duplication of the power supplies to achieve isolation is also thus obviated.

DETAILED DESCRIPTION

Figure 1:
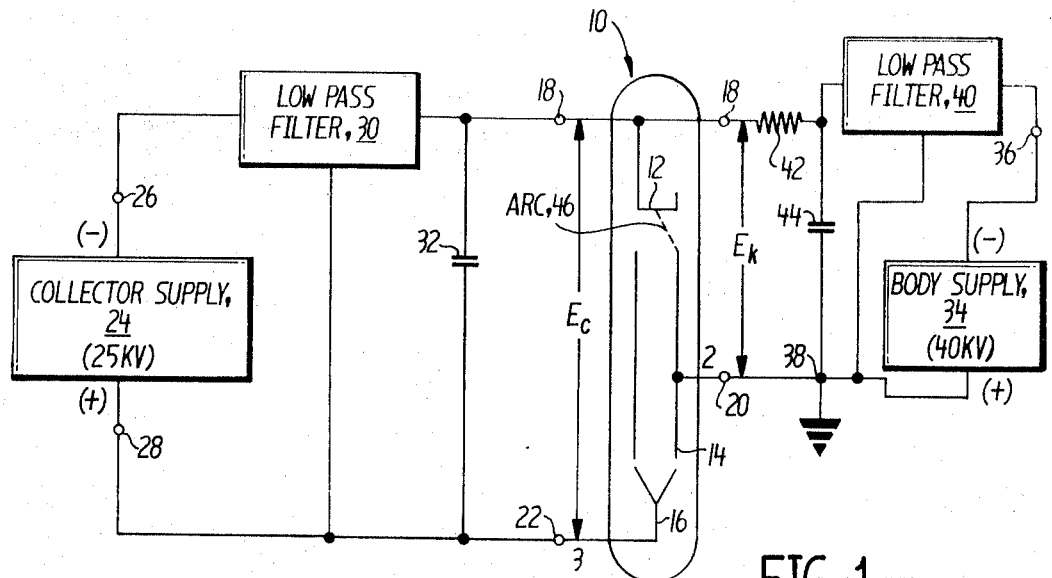
FIG. 1 comprises a simplified schematic of a prior art power supply system for a linear beam device in which independent power supplies are used for the collector electrode and body member of the device.

FIG. 1 illustrates a prior art power supply arrangement for a typical linear beam device 10. The linear beam device 10 may comprise an electron beam emitting or cathode electrode 12, a body member 14 forming the body of the linear beam device, and a collector or anode electrode 16. The cathode electrode 12, the anode electrode 16 and the body member 14 have terminals 18, 20 and 22 respectively associated therewith.

The negative output terminal 26 of a collector power supply 24 may be connected through a conventional low pass filter 30, e.g., an LC filter, to the cathode terminal 18 of the linear beam device and the positive output terminal 28 thereof connected to the collector terminal 22 of the linear beam device. As is conventional, the low pass filter 30 is connected, typically through a large capacitor 32, to the terminal 28 on the other side of the power supply 24. The collector supply capacitor 32 is connected between the terminals 18 and 22 to complete the collector supply circuit.

A body power supply 34 having a negative terminal 36 and a positive terminal 38 is typically connected between the cathode terminal 18 and the body member terminal 20. The terminal 20 may be connected to ground potential and the terminal 36 may be connected to the cathode terminal 18 through a low pass filter 40 and a current limiting resistor 42. The low pass filter 40 may be connected to the terminal 38 on the other side of the power supply 34. A body power supply capacitor 44 is connected between ground potential and the interconnection of the resistor 42 and the low pass filter 40.

In operation, a body power supply voltage $E_K$ is applied between the cathode electrode 12 and the body member 14, and a collector power supply voltage $E_C$ is applied between the cathode electrode 12 and the collector or anode electrode 16. In a typical case, the body power supply voltage $E_K$ may be on the order of 40 Kv. and the collector power supply voltage may be on the order of 25 Kv. It will be appreciated that the collector power supply is floating with respect to ground potential to isolate the collector power supply 24 from the body power supply 34.

Should arcing occur, as is generally indicated in phantom at 46, the body supply capacitor 44 may be discharged through the cathode electrode 12 to ground potential via the body member terminal 20. Typically, the current drawn by the linear beam device 10 from the body supply capacitor 44 is a small fraction of the total linear beam device current. Consequently, the current limiting resistor 42 may be utilized to limit the peak current drawn from the body power supply capacitor 44 by the arc, thereby reducing the amount of arc damage to the linear beam device without the necessity for dissipation of a large amount of power in the resistor during normal operation. In this embodiment no portion of the arcing current is supplied by the collector power supply 24 since the collector power supply capacitor 32 is not discharged by the arc.

Figure 2:
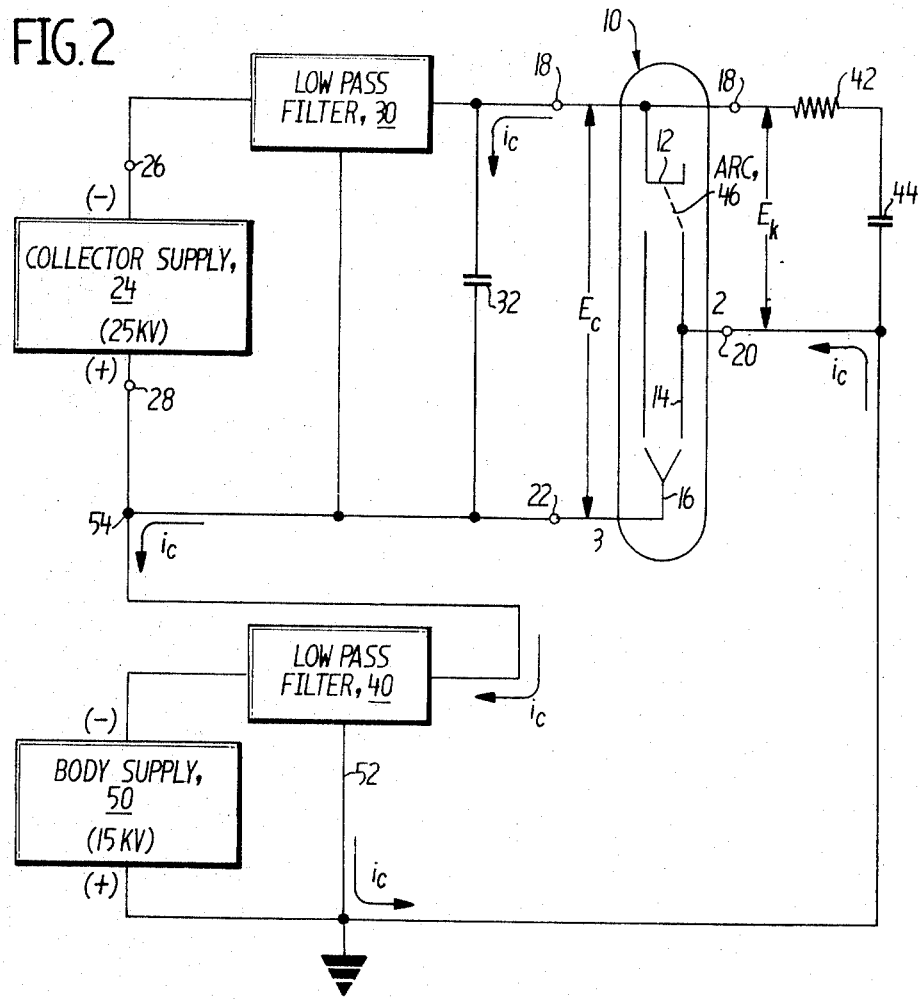
FIG. 2 comprises a simplified schematic of a series connected power supply system for a linear beam device.

As shown in FIG. 2, the 40 Kv. body power supply 34 of FIG. 1 has been eliminated. In its place, a body power supply 50 is connected in series at an interconnection point 54 with the collector power supply 24 between the cathode electrode 12 and the body member 14 to provide the desired cathode electrode-to-body member potential. The body power supply 50 may be a 15 Kv. supply, which, in combination with the 25 Kv. collector power supply 24 may provide the 40 Kv. potential difference between the terminals 18 and 20 necessary for the operation of the linear beam device 10.

While the necessity of a further high voltage power supply is eliminated in this configuration, the arcing current would include not only the discharge current from the body power supply capacitor 44, but would also include the discharge current from the collector power supply capacitor 32. The discharge current occurs because the collector power supply 24 is no longer independent of the body power supply, and because there now exists a discharge circuit for the capacitor 32 to ground potential via the capacitive leg of the low pass filter 40. An arc between the collector electrode 12 and the body member 14 completes the discharging circuit such that the cathode electrode 12 rapidly falls to ground potential. In a typical case, the collector or anode potential at the terminal 22 is maintained at approximately $-0.4\ E_K$ with respect to ground potential. During arcing, the terminal 22 rises rapidly to a $+0.6 E_K$ potential. Assuming that there is no collector electrode-to-body member arcing, the current between the cathode electrode and the body member will be increased in proportion to the current generated by discharge of the collector power supply capacitor 32.

It will be appreciated that current limiting resistors are not added in series with the discharge path of the collector power supply capacitor 32 because of the larger fraction of total cathode electrode current drawn by the collector electrode. This larger fraction of total cathode electrode current must be restricted in value so as not to dissipate a large amount of power in the current limiter during normal operation of the device. Because of this average power dissipation limitation, conventional current limiters cannot be used in the cathode power supply circuit. As a result, the peak fault current discharged from the collector power supply capacitor 32 may be higher than that from the body power supply capacitor 44. When the unlimited collector power supply current is added to the body power supply current, more damage results to the linear beam device 10 than if the collector power supply current could be limited.

Figure 3:
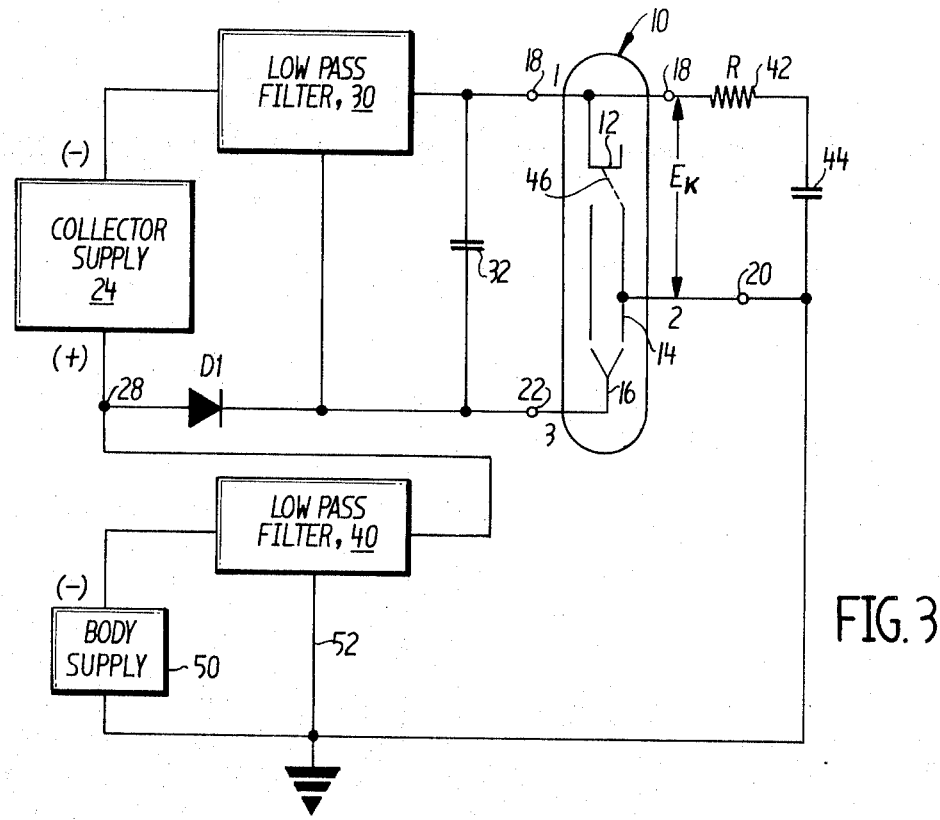
FIG. 3 comprises a simplified schematic of a series connected power supply for the linear beam device shown in FIG. 2, showing the insertion of a diode between the collector power supply capacitor and the interconnection of the body power supply and the collector power supply; and, FIG. 4 comprises a simplified schematic of a power supply system for use with multiple electrodes in a linear beam device in which each of the power supplies for the various electrodes of the device is connected in series with the body power supply, and in which a diode is interposed between the capacitors connected to these electrodes and the interconnection of these power supplies with the body power supply.

By adding a diode $D_1$ as shown in FIG. 3 between the collector terminal 22 and the terminal 28 of the power supply 24, the discharge from the collector power supply capacitor 32 into the linear beam device 10 is prohibited in the event of cathode electrode-to-body member arcing. It will be appreciated that the interposition of the diode $D_1$ between the terminals 22 and 28 does not prohibit the normal flow of current from the collector and body power supplies.

In the event of a cathode electrode-to-body member arc, the cathode potential $E_K$ rapidly falls to ground potential discharging the body power supply capacitor 44 into the arc. The collector potential $E_C$ of the linear beam device 10 which has been maintained at approximately $-0.4\ E_K$ with respect to ground rises rapidly to $+0.6\ E_K$ with respect to ground but does not discharge into the cathode electrode-to-body member arc because of the blocking action of the diode $D_1$.

It will be appreciated that the linear beam device 10 is typically designed to be capable of dissipating the energy stored in the body power supply capacitor 44 without damage. Further, the linear beam device 10 may be designed such that the collector electrode-to-body member circuit will not arc as a result of the excursion of the collector voltage from $-0.4\ E_K$ to $+0.6\ E_K$ relative to ground potential. Thus, the linear beam device 10 may be designed to withstand the energy stored in the body power supply capacitor 44 when it is dumped into the linear beam device 10 through the current limiting resistor 42, and further to withstand, without arcing of the collector electrode to the body member, the voltage excursion on the collector electrode when the cathode electrode arcs to the body member.

Figure 4:
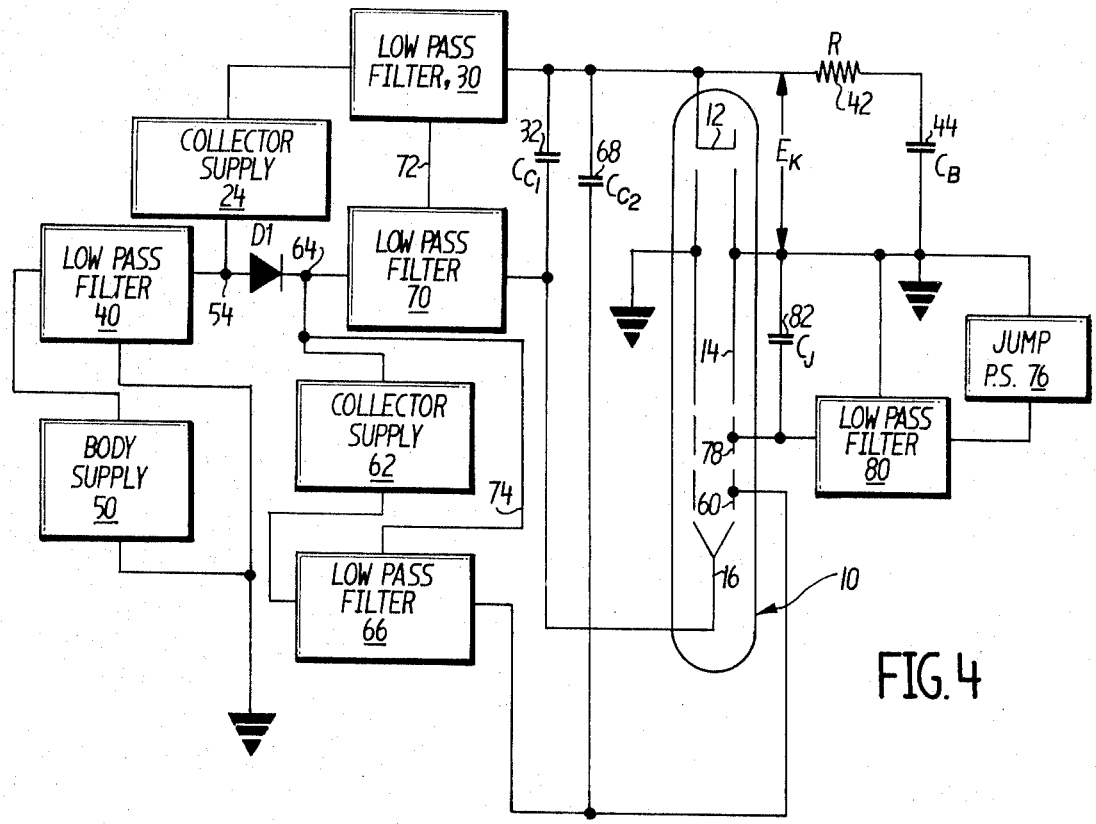

Referring to FIG. 4, an alternative embodiment is shown having an additional collector electrode 60 added to the linear beam device 10 for electron beam control purposes. Like elements in the figures are provided with like numbers to facilitate an understanding of the invention.

The collector electrode 60 is provided with a power supply 62 connected in series at a terminal 64 with the body power supply 50 between the body member of the linear beam device 10 and the collector electrode 60 through the diode $D_1$ and through a low pass filter 66. A further collector power supply capacitor 68 is connected between the cathode electrode 12 and the collector electrode 60 to provide the necessary power for the operation of the device. In addition, a further low pass filter 70 may be coupled between the terminal 64 and the collector electrode side of the collector power supply capacitor 32. The legs of the low pass filters 30 and 70 may be interconnected by the line 72 and a leg of the low pass filter 66 may be connected to the other side of the power supply 62 by a lead 74.

In addition, a jump power supply 76 may be provided between a further body electrode 78 of the device 10 and the body member 14 for further controlling the electron beam. A low pass filter 80 is interposed between the jump power supply 76 and the collector electrode 78 and a jump capacitor 82 is connected between the body member 14 of the device 10 and the collector electrode 78 to provide power therefor. Since the jump power supply capacitor 82 is not connected to the cathode electrode 12, no cathode electrode-to-body member arcing protection need be provided.

In operation upon the occurrence of an arc between the cathode electrode 12 and the body member 14, both of the collector power supply capacitors 32 and 68 are prevented from discharging through the low pass filter 40 in the body power supply 50 to ground potential by the diode $D_1$. Any number of body member elements may be safely energized through power supplies connected in series with the power body supply so long as they are connected thereto through the diode $D_1$.

ADVANTAGES AND SCOPE OF THE INVENTION

From the foregoing, it is apparent that a plurality of serially connected power supplies may be utilized to provide the anode-cathode electrode power to a linear beam device. In this manner that the power of the individual power supplies necessary for linear beam device operation may be reduced. The insertion of a diode between the point of interconnection of the power supplies for the device and the power supply capacitor coupled between the cathode electrode of the device and the collector electrodes or other elements of the device prevents the discharge of the power supply capacitor in the cathode electrode-to-body member arc. The use of complicated shunting circuitry is thus avoided as is the use of crowbar circuits.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A power supply for a linear beam device including an anode electrode, a cathode electrode and a body member comprising:
   a first power supply means comprising a large storage capacitor connected between the anode electrode and cathode electrode of the linear beam device and means for supplying charge to storage capacitor;
   a second power supply means connected between the anode electrode and body member of the linear beam device, said first and second power supply means being connected in series aiding between the cathode electrode and the body member of the linear beam device; and,
   means for preventing current flow from a discharge of said storage capacitor to the body member of the linear beam device through the second power supply means.

2. The power supply of claim 1 wherein said means for preventing current flow from the anode electrode to the body member includes a diode having the cathode electrode thereof connected to the anode electrode of the linear beam device.

3. The power supply of claim 2 wherein said diode is a semiconductor.

4. The power supply of claim 1 wherein the voltage of said first power supply means is substantially greater than the voltage of said second power supply means.

5. The power supply of claim 1 including a current limiting element connected between the cathode electrode and the body member of the linear beam device.

6. The power supply of claim 5 including a capacitor connected between the anode electrode and the cathode electrode of the linear beam device; and,
   wherein said second power supply means includes low pass filter means, said current flow preventing means being operative to prevent the discharge of said capacitor through said low pass filter means.

7. Apparatus comprising:
   a linear beam device including an anode electrode, a cathode electrode and a body member;
   power supply means connected between the cathode electrode and the body member of said linear beam device;
   circuit means for applying a portion of the voltage of said power supply means between the cathode electrode and the anode electrode of said linear beam device; and,
   means for preventing current flow from the anode electrode to the body member of said linear beam device through the said power supply means.

8. The apparatus of claim 7 wherein said means for preventing current flow from the anode electrode to the body member includes a diode having the cathode electrode thereof connected to the anode electrode of the linear beam device.

9. The apparatus of claim 8 wherein the portion of the voltage applied between the cathode electrode and the anode electrode of said linear beam device is substantially less than the total voltage of said power supply means.

10. The apparatus of claim 9 including current limiting means connected between the cathode electrode and the body member of said linear beam device; and,
    wherein said diode is a semiconductor.

11. A method for limiting the current from a power supply upon arcing between the cathode electrode and the body member of a linear beam device comprising the steps of:
a. applying the entire voltage of the power supply between the cathode electrode and the body member of the linear beam device;
b. applying a significantly smaller portion of the voltage of the power supply between the cathode electrode and the anode electrode of the linear beam device; and,
c. blocking current flow from the anode electrode to the body member of the linear beam device through the power supply means.

12. A method of limiting the cathode electrode to body member arcing current of a linear beam device comprising the steps of:
a. applying a first voltage between an anode electrode and the cathode electrode of the the linear beam device;
b. applying a second voltage between the anode electrode and the body member of the linear beam device in series aiding with the first voltage applied between the cathode electrode and the anode electrode of the linear beam device; and,
c. preventing current flow exteriorly of the linear beam device from the anode electrode to the body member of the linear beam device.

* * * * *